US005318154A

United States Patent [19]

Hellman, Jr. et al.

[11] Patent Number: 5,318,154

[45] Date of Patent: Jun. 7, 1994

[54] COLUMN FOR LOAD LIFTING DEVICES

[76] Inventors: Robert R. Hellman, Jr., 3 McKinley St., Naugatuck, Conn. 06770; Thomas P. Aquila, Sr., 1265 Dunbar Hill Rd., Hamden, Conn. 06514

[21] Appl. No.: 899,318

[22] Filed: Jun. 16, 1992

[51] Int. Cl.[5] .............................................. B60S 13/00

[52] U.S. Cl. ....................................... 187/8.41; 52/727

[58] Field of Search ........................ 187/8.41, 95, 8.43, 187/8.45, 9 R; 254/89 R; 52/724, 725, 727, 732, 304, 423

[56] References Cited

U.S. PATENT DOCUMENTS

| | | | |
|---|---|---|---|
| 157,920 | 12/1874 | Manes | 52/727 |
| 1,643,955 | 10/1927 | Rank et al. | 52/727 |
| 2,593,635 | 4/1952 | Walker | 254/92 |
| 2,843,222 | 7/1958 | Villars | 187/8.41 |
| 3,687,234 | 8/1972 | Gendreau | 187/25 |
| 3,722,627 | 3/1973 | Fricke | 187/8.41 |
| 4,212,449 | 7/1980 | Tsujimura | 254/89 H |
| 4,457,401 | 7/1984 | Taylor et al. | 187/8.49 |
| 4,679,660 | 7/1987 | Suzuki | 187/8.41 |
| 4,763,761 | 8/1988 | McKinsey et al. | 187/8.41 |
| 4,934,487 | 6/1990 | Isogai | 187/8.67 |
| 5,009,287 | 4/1991 | Starr | 187/8.41 |

*Primary Examiner*—D. Glenn Dayoan
*Assistant Examiner*—Kenneth Noland
*Attorney, Agent, or Firm*—John H. Crozier

[57] ABSTRACT

In a preferred embodiment, a vertical column for load lifting devices, which includes: a generally rectangular vertical outer shell; a generally rectilinear vertical inner shell; and the inner shell being joined to the outer shell so as to form four vertical interior rectangular tubes at the corners of the outer shell.

12 Claims, 4 Drawing Sheets

COLUMN FOR LOAD LIFTING DEVICES

BACKGROUND OF THE INVENTION

1. Field of the Invention

The present invention relates to load lifting devices generally and, more particularly, but not by way of limitation, to a novel column for load lifting devices.

2. Background Art

Many load lifting devices, such as free standing vehicle lifts, for example, require vertical support members within, or upon, which a moving member rides.

Typically, such columns are formed of heavy steel stock of a single wall thickness, often fabricated by expensive roll forming. Thicknesses may range up to $\frac{3}{8}$-inch or more. Such a construction "wastes" material in the sense that some portions of the column are thicker than the loads thereon require and the resulting columns are heavy in relation to the loads that they can handle.

Many manufacturers of such columns wish to provide a series of such columns with each column in the series sized to handle a given maximum load. Typically, each column in the series has its own design and it is not possible to make small adjustments to a basic design to increase the load handling capabilities thereof, particularly when the elements of the column are produced by the expensive method of roll forming because the roll forming machinery lacks flexibility.

A substantial disadvantage of columns for vehicle lifts having internal movable members is that the internal volume of the columns is almost entirely reserved for the movement therein of the movable members. Consequently, electrical cables, hydraulic lines, pneumatic lines, equalizing cables, and the like must be located on the outside of the column. Such exposed elements present a safety hazard to operators and present a risk of damage to the lift in a busy environment.

A further problem with having the moving member substantially fill the interior volume of the column is that workmen often drill holes through the wall of the column for the attachment thereto of cables, control panels, etc. When the lift is next operated, the moving member is damaged.

Accordingly, it is a principal object of the present invention to provide a column for load lifting devices that is lightweight, yet rigid, and has a high capacity to weight ratio.

It is a further object of the invention to provide such a column to which relatively minor changes can by made to increase the load handling capability thereof.

It is an additional object of the invention to provide such a column in which operating lines and cables can be disposed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a vertical column for load lifting devices, comprising: a generally rectangular vertical outer shell; a generally rectilinear vertical inner shell; and said inner shell being joined to said outer shell so as to form four vertical interior rectangular tubes at the corners of said outer shell.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
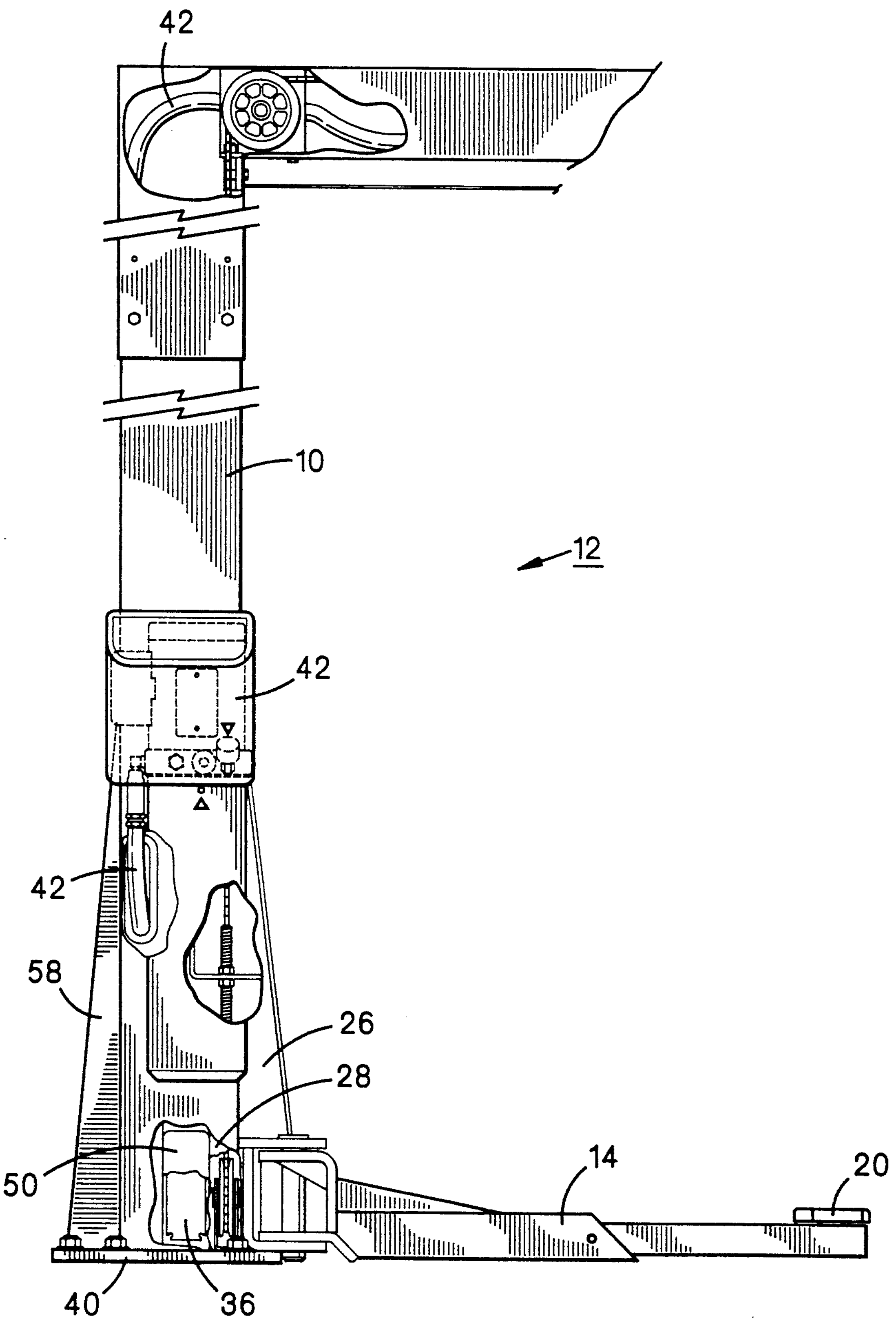
FIG. 1 is a front elevational view, partially cut-away, of a column according to the present invention employed in a vehicle lift.

Reference should now be made to the drawing figures, on which similar or identical elements are given consistent identifying numerals throughout the various figures thereof, and on which parenthetical references to figure numbers direct the reader to the view(s) in which the element(s) being described is (are) best seen, although the element(s) may be seen also in other views.

FIG. 1 illustrates a column 10 for load lifting devices constructed according to the present invention employed in a vehicle lift, generally indicated by the reference numeral 12.

Lift 12 includes front and rear telescoping arm assemblies 14 and 16 (FIG. 2 only) having at the distal ends thereof pads 20 and 22, respectively, which, in use, would be placed at selected points under a vehicle to be lifted above the surface on which the lift is installed. Arms 14 and 16 are attached to an outer carriage assembly 26 which is attached to an inner carriage assembly 28. Inner carriage assembly 28 is operatively connected to a hydraulic cylinder 30 (FIG. 2), the latter being provided to raise and lower arms 14 and 16 along column 10. An overhead member 34 extends between the top of column 10 and the top of a similar column (not shown) incorporated in a similar lift (not shown). Inner carriage assembly 28 includes slider blocks 36 and 38. Lift 12 includes a base plate 40. Since the operation of lift 12 is conventional, no further description thereof need be made.

Figure 3:
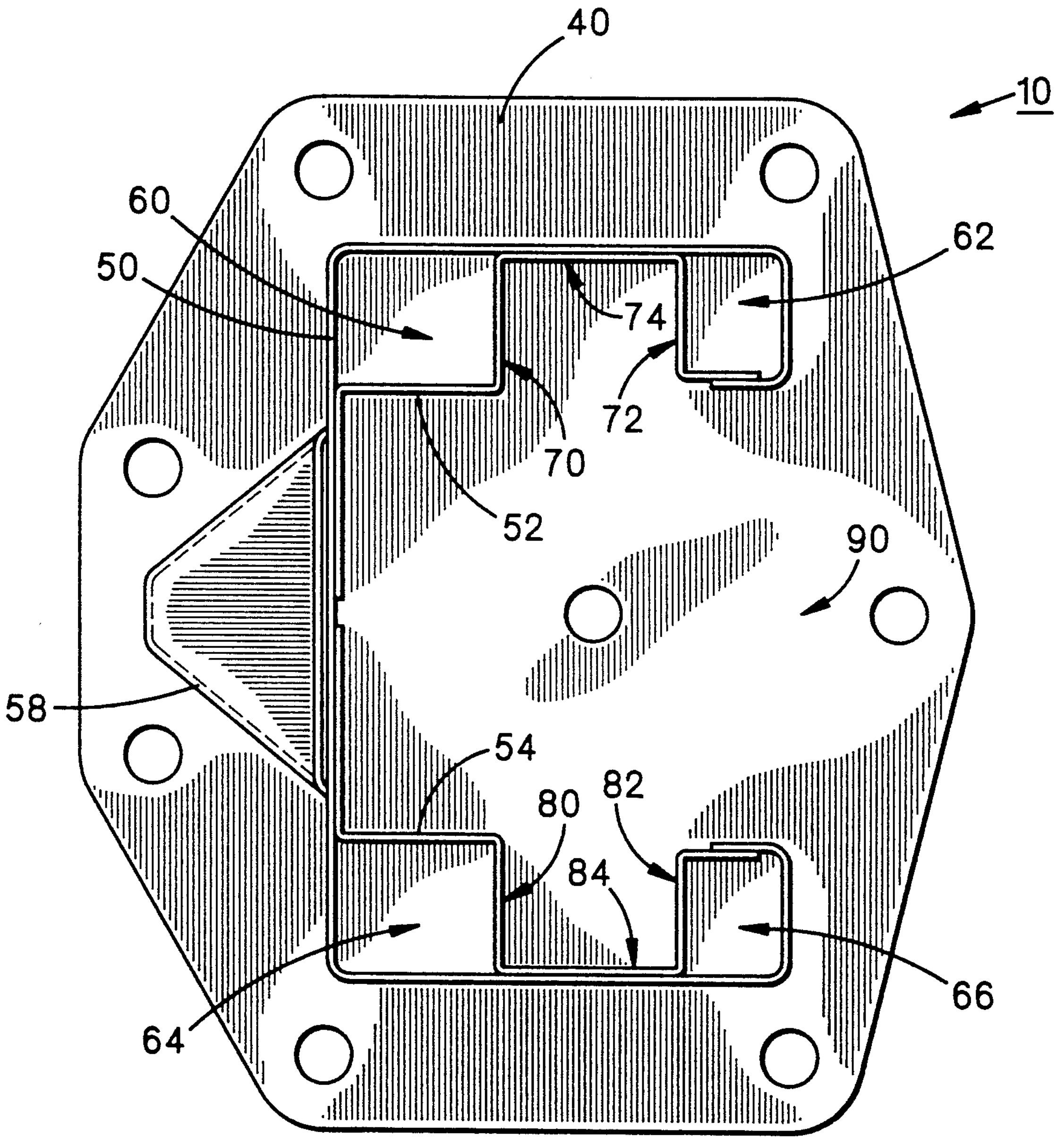
FIG. 3 is a top plan view of the column of FIG. 1.
Figure 4:
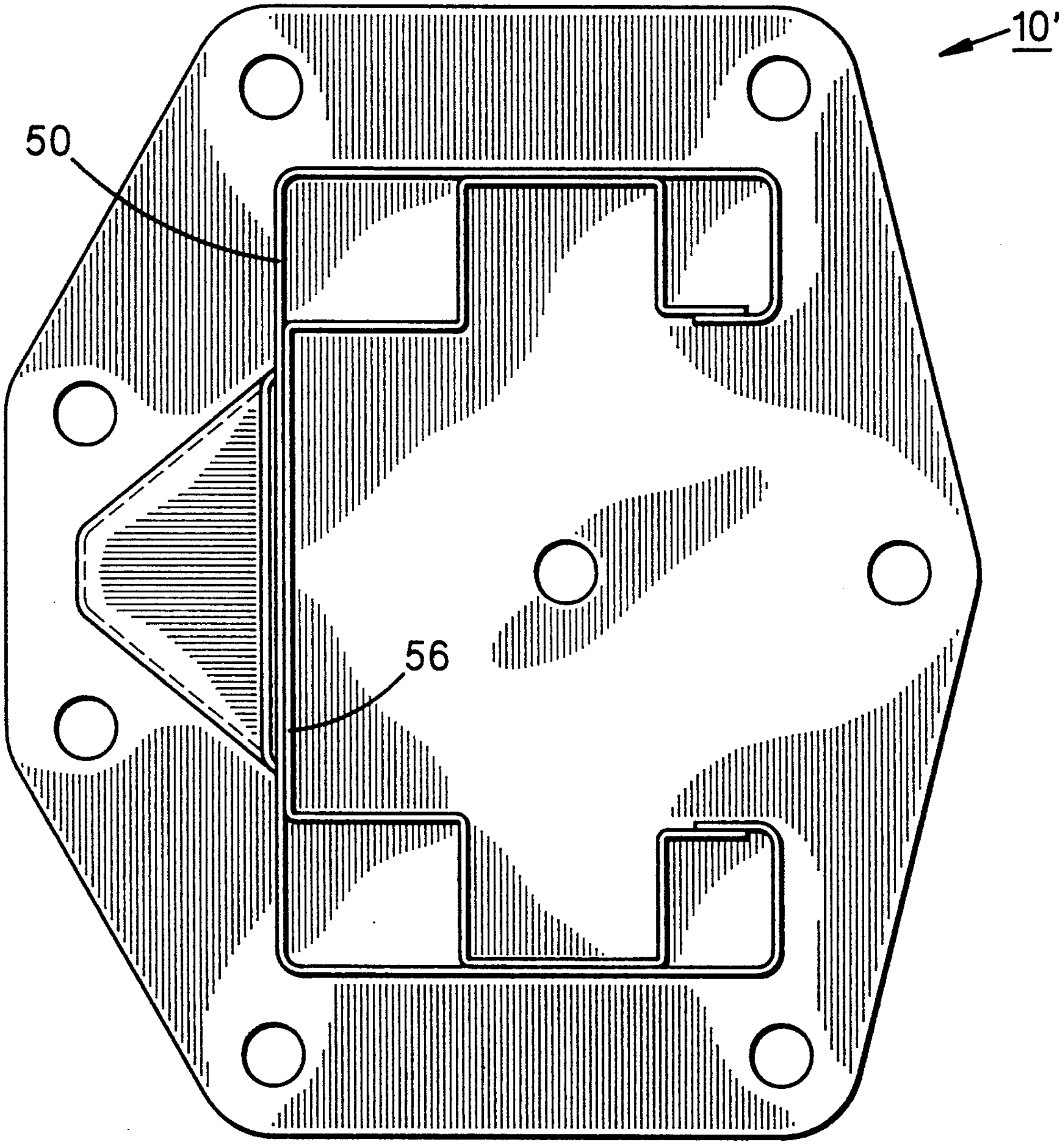
FIG. 4 is a top plan view of the column of FIG. 1 in an alternative embodiment.

Reference should now also be made to FIGS. 3 and 4 for a more detailed understanding of the construction of column 10.

FIG. 3 provides a detailed view of the construction of column 10 in one embodiment. Column 10 includes an outer shell 50 and two inner shells 52 and 54. FIG. 4 shows an identical view of the construction of a column 10', identical to column 10 of FIG. 3, except that inner shells 52 and 54 are replaced by a single inner shell 56. The embodiment of FIG. 3 is preferable for more convenient construction of inner shells 52 and 54 when those elements are formed on a press brake. Inner shells 52 and 54 are also identical forms. Inner shell 56 on FIG. 4 may also be formed on a press brake, but would normally be provided when roll forming is employed. Since the use and advantages of both constructions are the same, the invention will be further described with reference only to FIG. 3 together with FIGS. 1 and 2.

Figure 2:
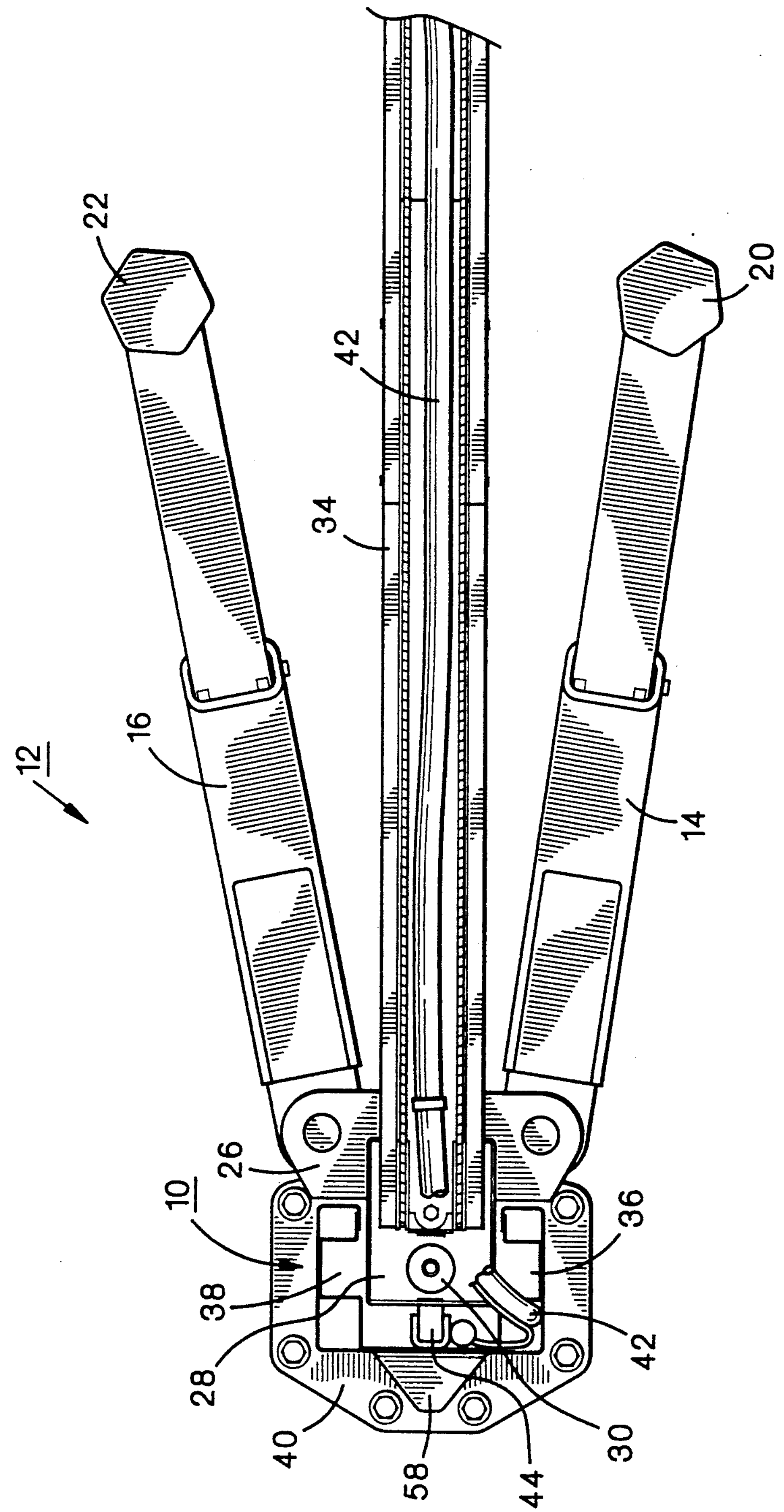
FIG. 2 is a top plan view of the lift of FIG. 1.

Outer shell 50 and inner shells 52 and 54 are cojoined so as to define four tubes 60, 62, 64, and 66 at opposing corners of column 10. The outer surfaces of opposing walls 70 and 72 of tubes 60 and 62, respectively, with cojoined wall 74 of inner shell 52 provide three rectilinear working surfaces for engagement thereof by slider blocks 36 (FIGS. 1 and 2) and 38 (FIG. 2). Likewise, the outer surfaces of opposing walls 80 and 82 of tubes 64 and 66, respectively, with cojoined wall 84 of inner shell 54 provide three rectilinear surfaces for engagement thereof by slider blocks 36 and 38.

An opening 90 is defined between tubes 62 and 66 for the extension of outer carriage assembly 26 from inner carriage assembly 28 (FIGS. 1 and 2).

A gusset column 58 is attached between the lower portion of outer shell 50 and base 40 for reinforcement against bending moment.

In use, inner shells 52 and 54 react the relatively high load of the carriage blocks to outer shell 50. Outer shell 50, with the assistance of inner shells 52 and 54, where attached to the outer shell, and gusset column 58 in turn react this load to base plate 40.

Should it be desired to design column 10 to carry higher loads, the depth of the column can be easily increased by simply increasing the depth of tubes 60 and 64. If required, the load handling capability of column 10 can also be increased substantially by a modest increase in the thickness of the steel stock used for outer shell 50. Thus, the gage and section of the components of the column are somewhat independent, allowing optimization of the basic design for a range of applications.

Shells 50, 52, and 54 are conveniently formed on a press brake from steel sheet stock and, for lifting loads of, say, three to six tons, it has been found that 10 gauge steel is satisfactory. Inner shells 52 and 54 may be conventionally attached to outer shell 52 by plug- or spot-welding.

Tubes 60, 62, 64, and 66 provide areas along column 10 where outer shell 50 can be drilled for the attachment thereto of a control panel 46 (FIG. 1) and other items (not shown) without fear of damaging inner carriage assembly 28 (FIGS. 1 and 2).

Tubes 60, 62, 64, and 66 also provide passages for a hydraulic line 42 (FIGS. 1 and 2), and electrical cables and pneumatic lines (not shown). The interior of column 10 also accommodates a pawl 44 (FIG. 2). Thus, the exterior of column 10 is free of elements which would otherwise constitute a safety hazard or a source of potential damage to lift 12 should any of the elements become damaged.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A vertical column for load lifting devices, comprising:

(a) said column being rectangular in cross-section;

(b) four vertical interior rectangular tubes at the corners of said column and integral therewith, one of more of said tubes to receive therein hydraulic, pneumatic, or electrical lines to facilitate lifting of said load; and (c) a vertical opening defined in one side of said column, said opening to receive therein a carriage assembly to lift said load.

2. A column, as defined in claim 1, wherein said column includes cojoined inner and outer shells and:

(a) said outer shell includes a vertical back wall, first and second vertical side walls attached orthogonally to either side of said back wall at first edges of said side walls, and a front wall attached orthogonally to second edges of said side walls;

(b) said inner shell includes: a first vertical wall attached orthogonally to said front wall of said outer shell and extending inwardly toward said back wall thereof; a second vertical wall attached orthogonally to said first wall and extending to said first side wall of said outer shell so as to define a first one of said four tubes between said first and second walls, said first side wall, and said front wall; a third vertical wall adjacent and attached to said first side wall and attached orthogonally to said second wall and extending toward said back wall; a fourth vertical wall attached orthogonally to said third wall and extending toward said second side wall; a fifth vertical wall attached orthogonally to said fourth wall and extending to said back wall so as to define a second of said four tubes between said fourth and fifth walls, said first side wall, and said back wall; a sixth vertical wall adjacent and attached to said back wall and attached orthogonally to said fifth wall and extending toward said second side wall; a seventh vertical wall attached orthogonally to said sixth wall and extending away from said back wall; an eighth vertical wall attached orthogonally to said seventh wall and extending to said second side wall so as to define a third of said four tubes between said seventh and eighth walls, said back wall and said side wall; a ninth vertical wall adjacent and attached to said second side wall and attached orthogonally to said eighth wall and extending away from said back wall; a tenth vertical wall attached orthogonally to said ninth wall and extending toward said first side wall; and an eleventh vertical wall attached orthogonally to said tenth wall and attached orthogonally to said front wall of said outer shell so as to define a fourth of said four tubes between said tenth and eleventh walls, said second side wall, and said front wall.

3. A column, as defined in claim 2, further comprising said vertical opening being defined in said front wall between said first and fourth tubes.

4. A column, as defined in claim 3, wherein said first and eleventh walls are attached to inwardly facing tabs formed at the edges of said opening.

5. A vertical column for a vehicle lift of the type having a carriage movable within said column, said carriage having two slider blocks extending therefrom interiorly of said column for guiding said carriage therein and for transferring force to said column, comprising:

(a) a generally rectangular vertical outer shell;

(b) a generally rectilinear vertical inner shell;

(c) said inner shell being joined to said outer shell so as to form four vertical interior rectangular tubes at the corners of said outer shell; and (d) a vertical opening defined in one side of said column to accommodate the extension therefrom of said carriage.

6. A column, as defined in claim 5, further comprising:

(a) opposing facing outside walls of two of said four tubes disposed on one side of said opening and the wall joining them forming working surfaces for the engagement thereof by one of said two slider blocks; and (b) opposing facing outside walls of two of said four tubes disposed on the other side of said opening and the wall joining them forming working surfaces for the engagement thereof by the other of said two slider blocks.

7. A column, as defined in claim 5, wherein said column has sufficient interior volume to accommodate therein a lift pawl in addition to said carriage.

8. A column, as defined in claim 5, wherein said tubes have sufficient interior volume to accommodate therein one or more items selected from the group consisting of a hydraulic line, a pneumatic line, and an electrical cable.

9. A column, as defined in claim 5, wherein:

(a) said outer shell includes a vertical back wall, first and second vertical side walls attached orthogonally to either side of said back wall at first edges of said side walls, first and second vertical flanges attached orthogonally to second edges of said side walls and extending toward each other to define said opening therebetween;

(b) said inner shell includes: a first vertical wall attached orthogonally to said first flange of said outer shell and extending inwardly toward said back wall thereof; a second vertical wall attached orthogonally to said first wall and extending to said first side wall of said outer shell so as to define a first one of said four tubes between said first and second walls, said first side wall, and said first flange; a third vertical wall adjacent and attached to said first side wall and attached orthogonally to said second wall and extending toward said back wall; a fourth vertical wall attached orthogonally to said third wall and extending toward said second side wall; a fifth vertical wall attached orthogonally to said fourth wall and extending to said back wall so as to define a second of said four tubes between said fourth and fifth walls, said first side wall, and said back wall; a sixth vertical wall adjacent and attached to said back wall and attached orthogonally to said fifth wall and extending toward said second side wall; a seventh vertical wall attached orthogonally to said sixth wall and extending away from said back wall; an eighth vertical wall attached orthogonally to said seventh wall and extending to said second side wall so as to define a third of said four tubes between said seventh and eighth walls, said back wall and said side wall; a ninth vertical wall adjacent and attached to said second side wall and attached orthogonally to said eighth wall and extending away from said back wall; a tenth vertical wall attached orthogonally to said ninth wall and extending toward said first side wall; and an eleventh vertical wall attached orthogonally to said tenth wall and attached orthogonally to said second flange of said outer column so as to defined a fourth of said four tubes between said tenth and eleventh walls, said second side wall, and said second flange.

10. A column, as defined in claim 9, wherein said first and eleventh walls of said inner shell are attached to inwardly facing vertical tabs formed on the edges of said first and second flanges, respectively.

11. A column, as defined in claim 9, wherein said sixth wall of said inner shell is discontinuous such that said inner wall comprises two elements.

12. A column, as defined in claim 11, wherein said two elements are symmetrical.

* * * * *